(12) United States Patent
Bourdev

(10) Patent No.: US 9,400,925 B2
(45) Date of Patent: Jul. 26, 2016

(54) POSE-ALIGNED NETWORKS FOR DEEP ATTRIBUTE MODELING

(71) Applicant: Facebook, Inc., Menlo Park, CA (US)

(72) Inventor: Lubomir Dimitrov Bourdev, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 83 days.

(21) Appl. No.: 14/175,314

(22) Filed: Feb. 7, 2014

(65) Prior Publication Data

US 2015/0139485 A1     May 21, 2015

Related U.S. Application Data

(60) Provisional application No. 61/905,041, filed on Nov. 15, 2013.

(51) Int. Cl.
*G06K 9/00*     (2006.01)
*G06K 9/46*     (2006.01)
*G06K 9/62*     (2006.01)

(52) U.S. Cl.
CPC .......... *G06K 9/00362* (2013.01); *G06K 9/4628* (2013.01); *G06K 9/6292* (2013.01)

(58) Field of Classification Search
CPC .................................................. G06K 9/00362
See application file for complete search history.

(56) References Cited

U.S. PATENT DOCUMENTS

| 7,355,508 | B2* | 4/2008 | Mian | B60R 25/00 340/425.5 |
| 7,747,070 | B2* | 6/2010 | Puri | G06K 9/4628 382/157 |
| 8,929,612 | B2* | 1/2015 | Ambrus | G06K 9/00362 382/115 |
| 2003/0236661 | A1* | 12/2003 | Burges | G06K 9/4647 704/205 |
| 2005/0104727 | A1* | 5/2005 | Han | G06K 9/00335 340/541 |
| 2005/0104961 | A1* | 5/2005 | Han | G08B 13/19604 348/143 |
| 2006/0034495 | A1* | 2/2006 | Miller | G06K 9/00214 382/118 |
| 2006/0255986 | A1* | 11/2006 | Takanezawa | G08B 13/196 341/67 |
| 2007/0086655 | A1* | 4/2007 | Simard | G06K 9/4628 382/190 |
| 2008/0002862 | A1* | 1/2008 | Matsugu | G06K 9/00248 382/115 |
| 2009/0003709 | A1* | 1/2009 | Kaneda | G06K 9/4628 382/190 |
| 2009/0204605 | A1* | 8/2009 | Bai | G06F 17/30654 |
| 2010/0002920 | A1* | 1/2010 | Cosatto | G06K 9/00147 382/128 |
| 2010/0004915 | A1* | 1/2010 | Miller | G06K 9/0014 703/11 |

(Continued)

OTHER PUBLICATIONS

L. D. Bourdev, S. Maji, and J. Malik. Describing people: A poselet-based approach to attribute classification. In ICCV, 2011.*

(Continued)

*Primary Examiner* — Gandhi Thirugnanam
(74) *Attorney, Agent, or Firm* — Perkins Coie LLP

(57) ABSTRACT

Technology is disclosed for inferring human attributes from images of people. The attributes can include, for example, gender, age, hair, and/or clothing. The technology uses part-based models, e.g., Poselets, to locate multiple normalized part patches from an image. The normalized part patches are provided into trained convolutional neural networks to generate feature data. Each convolution neural network applies multiple stages of convolution operations to one part patch to generate a set of fully connected feature data. The feature data for all part patches are concatenated and then provided into multiple trained classifiers (e.g., linear support vector machines) to predict attributes of the image.

12 Claims, 12 Drawing Sheets

(56) References Cited

U.S. PATENT DOCUMENTS

| | | | | |
|---|---|---|---|---|
| 2011/0222724 | A1* | 9/2011 | Yang | G06K 9/00248 382/103 |
| 2014/0003708 | A1* | 1/2014 | Datta | G06K 9/6256 382/159 |
| 2014/0068740 | A1* | 3/2014 | LeCun | H04L 63/10 726/7 |
| 2014/0270488 | A1* | 9/2014 | Suleyman | G06K 9/00362 382/157 |
| 2015/0110394 | A1* | 4/2015 | Lerios | G06T 9/00 382/165 |
| 2015/0139485 | A1* | 5/2015 | Bourdev | G06K 9/00362 382/103 |

OTHER PUBLICATIONS

N. Zhang, M. Paluri, M. Ranzato, T. Darrell, and L. Bourdev. Panda: Pose aligned networks for deep attribute modeling. In CVPR, 2014.*

J. Donahue et al. "DeCAF: A Deep Convolution Activation Feature for Generic Visual Recognition", Oct. 6, 2013, http://arxiv.org/abs/1310.1531, p. 1-11.*

J. Joo et al. "Human Attribute Recognition by Rich Appearace Dictionary", 2013, 2013 IEEE International Conference on Computer Vision, p. 1-8.*

N. Zhang et al., "Deformable Part Descriptor for Fine-grained Recognition and Attribute Prediction", 2013, 2013 IEEE Internation Conference on Computer Vision, p. 1-8.*

* cited by examiner

Body feature 1

Body feature 16

Body feature 79

| Attribute | male | long hair | glasses | hat | tshirt | longsleeves | shorts | jeans | long pants | Mean AP |
|---|---|---|---|---|---|---|---|---|---|---|
| Traditional method 1 | 82.4 | 72.5 | 55.6 | 60.1 | 51.2 | 74.2 | 45.5 | 54.7 | 90.3 | 65.18 |
| Traditional method 2 | 83.7 | 70.0 | 38.1 | 73.4 | 49.8 | 78.1 | 64.1 | 78.1 | 93.5 | 69.88 |
| Process 500 | 91.7 | 82.7 | 70.0 | 74.2 | 49.8 | 86.0 | 79.1 | 81.0 | 96.4 | 78.98 |

(a) Query: Women with long hair who wear glasses.    (b) Query: people who wear hats and glasses.    (c) Query: men with short pants and glasses.

| Attribute | male | long hair | hat | glasses | dress | sunglasses | short sleeves | baby | mean AP |
|---|---|---|---|---|---|---|---|---|---|
| Traditional method 1 | 86.00 | 75.31 | 29.03 | 36.72 | 34.73 | 50.16 | 55.25 | 41.26 | 51.06 |
| Traditional method 2 | 85.84 | 72.40 | 27.55 | 23.94 | 48.55 | 34.36 | 54.75 | 41.38 | 48.60 |
| Traditional method 3 | 82.47 | 65.03 | 19.15 | 14.91 | 44.68 | 26.91 | 56.40 | 50.19 | 44.97 |
| Process 500 | 94.10 | 83.17 | 39.52 | 72.25 | 59.41 | 66.62 | 72.09 | 78.76 | 70.74 |

| Partition | male | long hair | glasses | hat | tshirt | longsleeves | shorts | jeans | long pants | Mean AP |
|---|---|---|---|---|---|---|---|---|---|---|
| Frontal | 92.55 | 88.40 | 77.09 | 74.40 | 51.69 | 86.84 | 78.00 | 79.63 | 95.70 | 80.47 |
| Profile | 91.42 | 50.38 | 37.06 | 69.47 | 49.02 | 84.61 | 85.57 | 82.71 | 98.10 | 73.04 |
| Back-facing | 88.65 | 63.77 | 72.61 | 72.19 | 55.20 | 84.32 | 74.01 | 86.12 | 96.68 | 77.06 |
| All | 91.66 | 82.70 | 69.95 | 74.22 | 49.84 | 86.01 | 79.08 | 80.99 | 96.37 | 78.98 |

*FIG. 10*

POSE-ALIGNED NETWORKS FOR DEEP ATTRIBUTE MODELING

CROSS-REFERENCE TO RELATED APPLICATION

This application claims the benefit of U.S. Provisional Patent Application No. 61/905,041, entitled "POSE ALIGNED NETWORKS FOR DEEP ATTRIBUTE MODELING", which was filed on Nov. 15, 2013, which is incorporated by reference herein in its entirety.

BACKGROUND

Computer vision techniques are used for recognizing human attributes, e.g., gender, age, race, hair style, and clothing style. These techniques have many applications, including facial recognition/verification, visual search, and automatic tagging of people.

Computer vision techniques sometimes employ attributes as an intermediate representation for knowledge transfer on object recognition tasks. Representing the image as a list of human selected attributes can help to recognize previously unseen objects with few or zero examples. Furthermore, the relative strength of attributes based on a ranking function for each attribute, can be applied to rich textual descriptions associated with the images. Vocabularies can be discovered automatically, e.g., by mining unlabeled text and image data sampled from the web. As a particular example, attribute recognition can be combined with an interactive crowdsourcing technique to discover both localized and discriminative attributes to differentiate people in photographs. Facial attributes and expressions can be learned for face verification and image search tasks. However, traditional techniques rely on just frontal face subjects in the images to recognize facial attributes.

Attribute recognition can be a very challenging task when dealing with non-frontal facing images, low image quality, occlusion (e.g., hidden features), and pose variations. The signals associated with some attributes can be subtle and the images can be dominated by the effects of poses and viewpoints. For example, considering the problem of detecting from an image whether a person wears glasses, the signal of glasses wireframe is weak as compared to the scale of the full person and the appearance can vary significantly depending on the head pose, frame design and occlusion by the subject's hair. Therefore, the underlying attributes can be hard to predict from the image due to the relative weak signal and pose variances.

BRIEF DESCRIPTION OF THE DRAWINGS

Objects, features and characteristics of the disclosed technology will become more apparent to those skilled in the art from a study of the following detailed description in conjunction with the appended claims and drawings, all of which form a part of this specification. In the drawings:

FIG. 6 illustrates a table showing the results of applying the process disclosed and traditional methods on a human attributes dataset.

FIG. 9 illustrates a table showing the results of applying the process disclosed and three traditional methods on another human attributes dataset.

FIG. 10 illustrates a table showing the performance of the process disclosed as a function of the viewpoint of the person.

DETAILED DESCRIPTION

References in this specification to "an embodiment," "one embodiment," or the like, mean that the particular feature, structure, or characteristic being described is included in at least one embodiment of the disclosed technology. Occurrences of such phrases in this specification do not all necessarily refer to the same embodiment or all embodiments, however.

Technology is disclosed for inferring human object attributes (e.g., gender, hair style, clothes, expression, action, etc.) from images of people or other objects under large variation of viewpoint, pose, appearance, articulation and occlusion. The technology uses part-based models, e.g., "Poselets," to locate multiple normalized part patches from an image. The normalized part patches are input into trained convolutional neural networks to generate feature data. Each convolution neural network applies multiple stages of convolution operations to one part patch to generate a set of fully connected feature data. The feature data for all part patches are concatenated and then input into multiple trained classifiers (e.g., linear support vector machines) to predict attributes in the image. The technology achieves accurate attribute classification in unconstrained settings.

The technology augments deep learning networks with input layers based on semantically aligned part patches. The technology identifies body features that are specific to part patches having some poses. The technology then combines the identified feature data produced by the deep learning networks and constructs a pose-normalized deep representation. Data of the pose-normalized deep representation is input into classifiers to predict attributes. The technology demonstrates a highly effective attribute classification capability on various image datasets.

The technology can use body features to factor out the pose and viewpoint variation, which allows the deep learning networks to focus on the pose-normalized appearance differences to achieve effective attribute classification with training using only a small number of images. The deep feature data from the deep learning networks can be concatenated and a global deep feature can be added. Because the feature data representation is generic, the technology can be effective not just for attribution classification, but also for other computer vision applications, e.g., detection, pose estimation, or action recognition.

Figure 1:
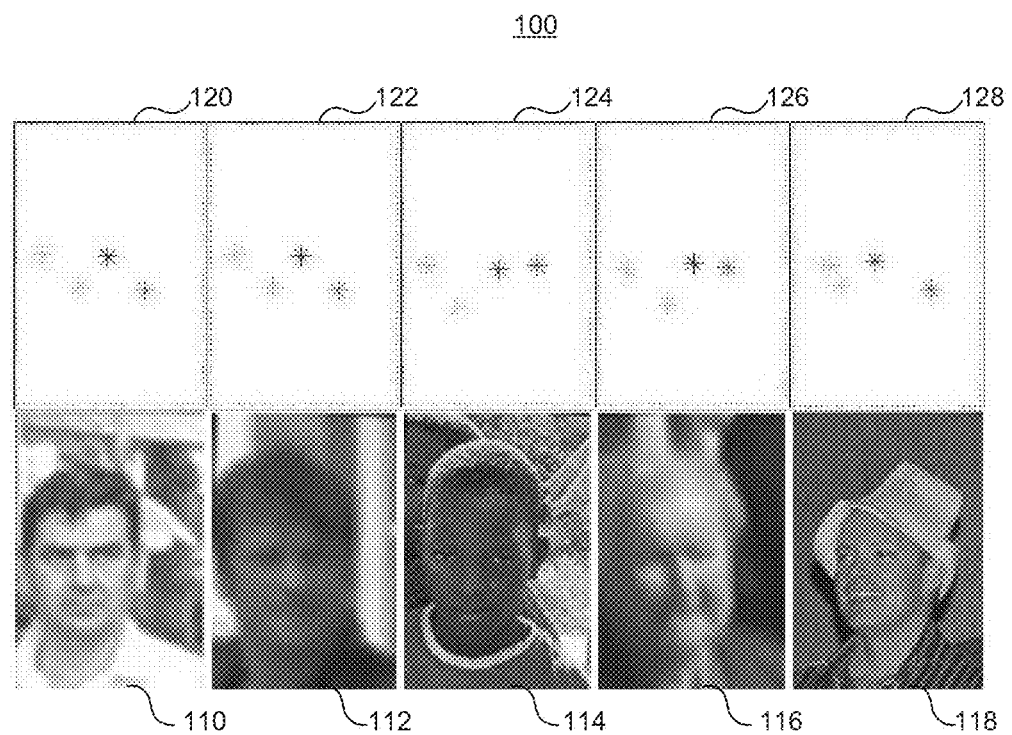
FIG. 1 is a block diagram illustrating an example database of part patches specific to a body feature of a frontal face and the configuration spaces for the part patches, on which the technology can operate in various embodiments.

The technology can first locate multiple part patches from a digital image depicting one or more persons. Each of the part patches includes at least a portion of the digital image corresponding to a body feature. The body feature is recognized as specific to a certain human body part (or body parts) under a certain pose. FIG. 1 is a block diagram illustrating an example database 100 of part patches specific to a body feature of a frontal face and the configuration spaces for the part patches, on which the technology can operate in various embodiments.

Each body feature describes a particular part of a human pose under a certain viewpoint. For example, the body feature of a front face can be defined by examples shown as part patches 110, 112, 114, 116 and 118 in FIG. 1. Each of the illustrated part patches 110, 112, 114, 116 and 118 depicts the specific body feature (e.g., a frontal face) of a person (not necessarily the same person among the part patches), at a given position, orientation, and scale. The embodiment illustrated in FIG. 1 shows the part patches as rectangular portions of the digital images. In other embodiments, the part patches can have shapes other than rectangles.

It is useful to think of a body feature as a cluster in a configuration space. Each of the part patches 110, 112, 114, 116 and 118 corresponds to a point in the configuration space of 3D poses. Such a point in the configuration space can be defined using coordinates of key points (also referred to herein as "keypoints") of a human pose. As shown in FIG. 1, each of the configuration space points 120, 122, 124, 126 and 128 includes keypoints of the frontal face human pose, which are points for the eyes, nose and left ear.

The distance in configuration space from example s to example r can be defined as: $d_s(r) = \Sigma_i w_s(i) \|x_s(i) - x_r(i)\|_2^2 (1 + h_{s,r}(i))$, where in this equation, $x_s(i) = [x, y, z]$ are the nominalized 3D coordinates of the i-th keypoints of the example s; and $w_s(i) \alpha \exp(-x_s(i)^2/(2\sigma^{-2}))$ is a weight that can be a Gaussian function with mean at the center of the patch. The Gaussian function can be designed to give high weights to terms near the center and low weights to terms far outside the patch. While FIG. 1 only shows keypoints inside the patch, in some embodiments nearby keypoints outside the patch can be considered in the configuration space as well. The term $h_{s,r}(i)$ can be a penalty value based on the visibility mismatch of keypoint i in the two examples. For example, if keypoint i is visible or invisible in both examples, then $h_{s,r}(i) = 0$. Otherwise $h_{s,r}(i) = a$, where a>0.

In addition, it is possible that the i-th keypoint is present in one example patch, but missing from the other. In such a case, the respective term that relates to the missing keypoint is $w_s(i)b$, where ($\sigma, a, b, h$) can be fixed parameters of the model.

Given an example s from human annotation $a_s$ (e.g., a text or image), the technology can efficiently find the corresponding closest example r from annotation $a_r$. In one embodiment, the technology can use, e.g., a weighted least squares fit based on $d_s(r)$ to derive the similarity transform ($t_x, t_y, \alpha, s$) that brings the keypoints of annotation $a_r$ close to the normalized coordinates of s. The technology can then measure the quality of the match based on a residual distance $d_s(r)$. The distance is measured in a 3D space, which enables the technology to distinguish between keypoints near each other and ones with large distances, and learn different body features from them.

The configuration space points 120, 122, 124, 126 and 128 belong to a tight cluster in the configuration space that corresponds to a specific body feature (e.g., frontal face). The tightness of the cluster can be defined, for example, based on the longest distance between any space points of the cluster.

The technology uses databases of patches corresponding to known body features (e.g., database 100 shown in FIG. 1) to detect body features from a digital image. The technology can employ N databases and each of the N databases can correspond to one of the N specific body features. The technology scans digital images using windows of various sizes. A candidate patch confined within a window is compared with patches of the databases of different specific body features. If the closeness of the candidate patch and a patch of a database of a body feature exceeds a threshold value, the candidate patch is selected as a part patch of the image corresponding to that body feature. Multiple part patches of the image responding to multiple body features can be detected during the scanning process. For example, the technology may find N part patches corresponding to all of the N specific body features that the technology uses. Alternatively, less than N part patches can be detected corresponding to a subset of the N specific body features.

Figure 2:
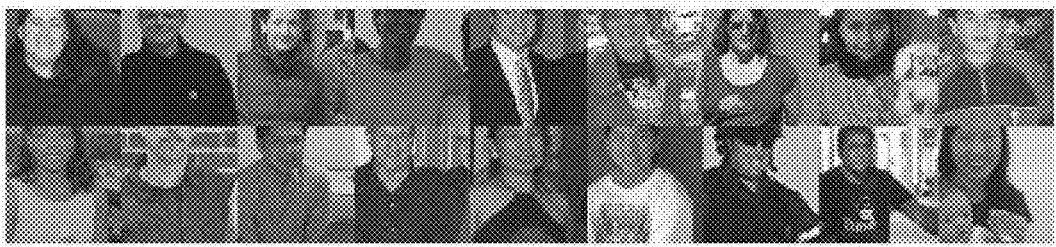
FIG. 2 is a part patch diagram illustrating example part patches detected from various images corresponding to three example body features, in various embodiments.
Figure 2:
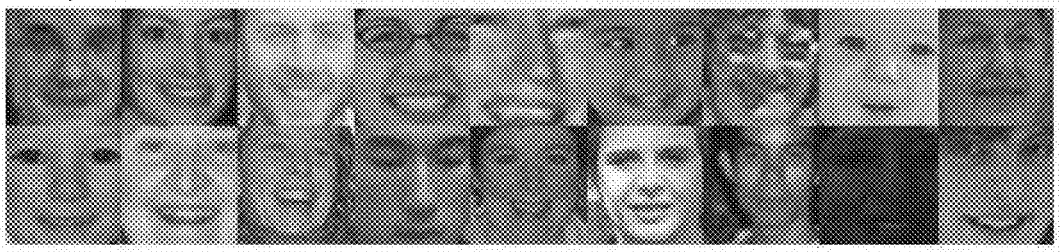
Figure 2:
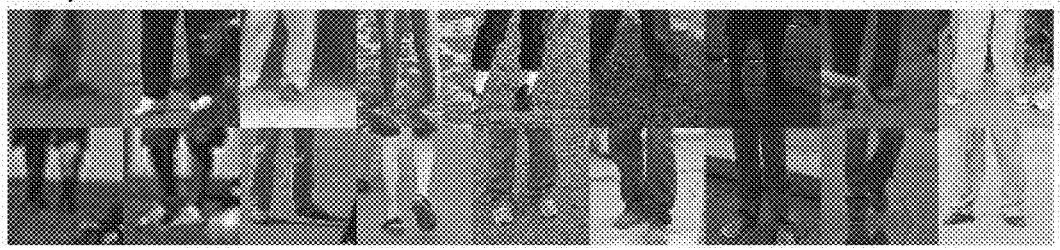

FIG. 2 is a part patch diagram illustrating example part patches detected from various images corresponding to three example body features, in various embodiments. For example, the top group of part patches ("Body feature 1") corresponds to a body feature of frontal upper body. The middle group of part patches ("Body feature 16") corresponds to a body feature of frontal face. The bottom group of part patches ("Body feature 79") corresponds to a body feature of frontal lower body including the legs and feet. Once the part patches corresponding to different body features are detected from an image, the part patches can be input into multiple deep learning networks.

Figure 3:
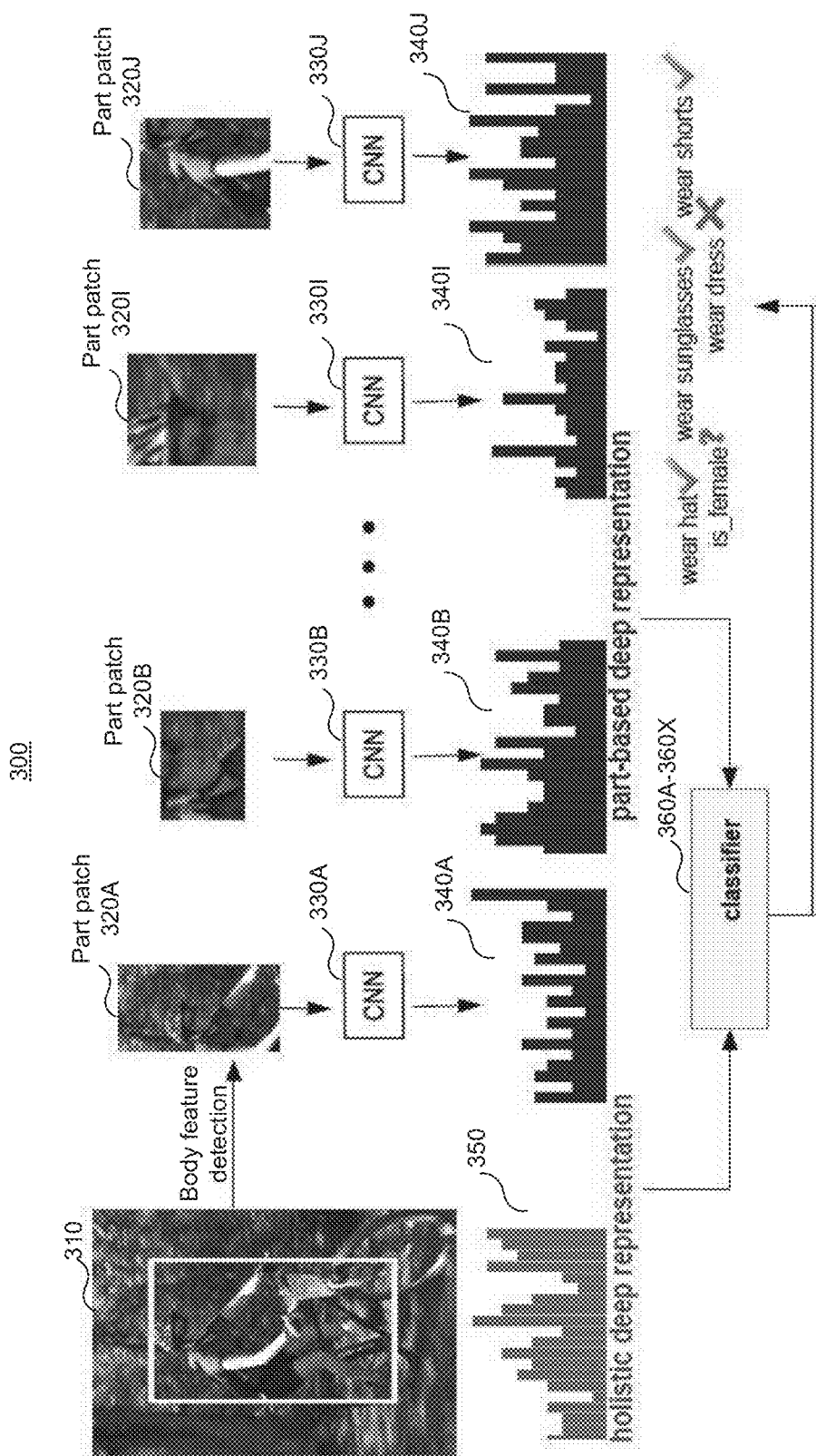
FIG. 3 is a data flow diagram illustrating a process for determining human attributes using part patches detected from a digital image, in various embodiments.

FIG. 3 is a data flow diagram illustrating a process for determining human attributes using part patches detected from a digital image, in various embodiments. A process 300 first detects multiple (e.g., J) part patches corresponding to different body features from a digital image 310. As shown in FIG. 3, part patch 320A corresponds to a body feature of a front upper body from a front right viewpoint. Part patch 320B corresponds to a body feature of a face and a neck from a front right viewpoint. Part patch 320I corresponds to a body feature of a face and a hat (or hair) from a front right viewpoint. Part patch 320J corresponds to a body feature of an upper body including a right shoulder and a right arm from a front right viewpoint. The total number J of the part patches 320A-320J can be equal to or less than a total number N of the available body features for process 300.

Optionally, the process 300 can resize the part patches 320A-320J to a common resolution of pixels, e.g., 56 by 56 pixels. The process 300 then provides the part patches 320A-320J to different deep learning networks 330A-330J. The deep learning networks 330A-330J correspond to the body features. For example, a deep learning network 330I can be trained using the database of the body feature of a face and a hat from a front right viewpoint. The part patch 320I can be input into a deep learning network 330I to generate a set of feature data 340I that is associated with the body feature of a face and a hat.

The deep learning networks 330A-330J can be, for example, artificial neural networks that have more than one hidden layer of artificial neurons, e.g., convolutional neural networks ("CNNs"). The neural networks are trained using patches associated with different body features. Multiple sets of feature data 340A-340J are generated by the deep learning networks 330A-330J. The process 300 concatenates the feature data sets 340A-340J into a set of concatenated feature data 345 (not shown).

The process 300 feeds the set of concatenated feature data 345 into a classification engine for predicting a human attribute. The process 300 can provide multiple classification engines 360A-360X (also referred to as "classifiers") for predicting different human attributes. As shown in FIG. 3, based on the results provided by the classification engines 360A-360X, the process 300 can determine various human attributes existing in the digital image 310, e.g., gender or clothing.

Figure 4:
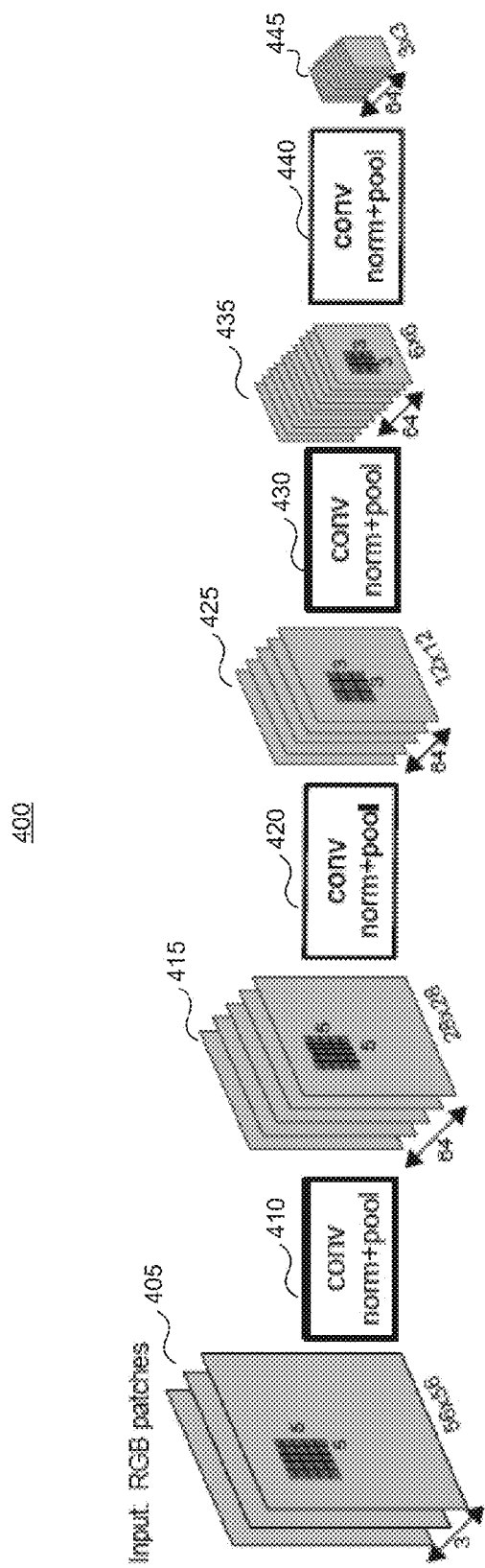
FIG. 4 is a block diagram illustrating an example of a convolutional neural network architecture, in various embodiments.

FIG. 4 is a block diagram illustrating an example of a convolutional neural network architecture, in various embodiments. Before feeding part patches into convolutional neural networks, the part patches can be resized to a common resolution, e.g., 56×56 pixels. The patches can be further randomly jittered and flipped (e.g., horizontally and/or vertically) to improve generalization of the patches. Then, a part patch associated with a specific body feature is input into the convolutional neural network 400 associated with the specific body feature. As shown in FIG. 4, the convolutional neural network 400 includes four operation stages 410, 420, 430 and 440 in various embodiments. The operation stages 410, 420, 430 and 440 can include none, one, or more convolution, max-pooling, and/or local response normalization operations.

An input part patch 405 can be broken down into three channels (also referred to as layers), e.g., red, green, and blue ("RGB") channels. Alternatively the input part patch can be broken down into other types of channels. The input data patch can be a two-dimensional image of any resolution, e.g., 56×56. Therefore, the input data set 405 for the operation stage 410 can have a dimension, e.g., of 56×56×3. The operation stage 410 includes a convolution operation using multiple convolution filters. For example, the convolution operation can use 64 filters each having a dimension, e.g., of 5×5×3 (as shown in FIG. 4 inside input part patch data set 405). The data set 405 can be provided to the 64 filters to generate 64 layers of filtered data. The operation state 410 can further include a normalization operation, to normalize the filtered data set, and a max-pooling operation to down-sample the filtered data set. The max-pooling operation can be a form of non-linear down-sampling, which partitions the layers of data into sets of non-overlapping rectangles. The maximum values within the non-overlapping rectangles can be retained after the max-pooling down-sampling. After the convolution operation, the normalization operation and the max-pooling operation, the output of the operation stage 410 can be a data set 415 that has a dimension, e.g., of 28×28×64.

The data set 415 can in turn be provided to the second operation stage 420. Similar to the operation stage 410, the operation stage 420 can also include a convolution operation, e.g., using 64 filters (with dimensions, e.g., of 5×5×64 as shown in FIG. 4), a normalization operation and a max-pooling operation for down-sampling. The output of the operation stage 420 after down-sampling is a data set 425 that has a dimension, e.g., of 12×12×64.

The data set 425 can in turn be input into the third operation stage 430. Similarly, the operation stage 430 also includes a convolution operation, e.g., using 64 filters (with dimensions, e.g., of 3×3×64 as shown in FIG. 4), a normalization operation and a max-pooling operation for down-sampling. The output of the operation stage 430 after down-sampling is a data set 435 that has a dimension, e.g., of 6×6×64.

Then the data set 435 can be input into the fourth operation stage 440. Similarly, the operation stage 440 also includes a convolution operation, e.g., using 64 filters (with dimensions, e.g., of 3×3×64 as shown in FIG. 4), a normalization operation and a max-pooling operation for down-sampling. The output of the operation stage 440 after down-sampling is a data set 445 that has a dimension, e.g., of 3×3×64.

Assuming that J is the total number part patches detected from the digital image, the part patches are provided into different convolutional neural networks to generate J sets of feature data that have dimensions, e.g., of 576 (3×3×64).

In some alternative embodiments, different types of deep learning networks or different numbers of convolutions, normalizations and max-pooling operations can be used to generate feature data. For example, if the input part patches are resized to a common resolution smaller than 56×56, less convolution, normalization and max-pooling operations may be used in the network 400. Alternatively, if the input part patches are resized to a common resolution larger than 56×56, more convolution, normalization and max-pooling operations may be used in the network 400.

The convolutional neural network 400 can be trained jointly by standard back-propagation of the error and stochastic gradient descent using as a loss function the sum of the log-losses of each attribute for each training sample. (Log-loss is a known statistical technique.) To deal with noise and inaccurate body feature detections, the convolutional neural network 400 can be trained using patches with high detection scores first and then gradually adding more patches with lower detection scores.

Although the embodiment illustrated in FIG. 4 uses a convolutional neural network 400, other types of deep learning networks may be used to generate the feature data sets. Different parts of the body may have different signals for each of the attributes and sometimes signals coming from one part cannot infer certain attributes accurately. For example, convolutional neural network trained on patches of people's legs may contain little information about whether a person wears a hat. Therefore, discriminative image representations for the different body features are generated separately through the deep learning networks and then combined for the final classification. For example, J feature data sets with dimensions, e.g., of 576 can be generated by feeding the part patches through the CNNs for different body features.

The total number J of the feature data sets can be equal to or less than the total number N of the available body features for the process 300. It is possible that no part patches are detected from the digital image for some of the N body features. The process 300 can simply leave these feature data set for these undetected body features as zero data sets. Zero data sets contain zeros as their content.

Then, the feature data sets can be concatenated together, e.g., into 576×N dimensional feature data set, as the process 300 in FIG. 3 suggests. In situations where some of the feature data set are zero data sets, the actual dimension of the concatenated data set can be less than 576×N.

The body-feature-based deep representation mentioned above leverages discriminative deep convolutional features as well as body feature correspondence. However, part patches detected based on body features may not always cover the whole image region. In some situations, images may contain a few undetected body features that cover major portions or even the entire image. To deal with these situations, a deep network covering the whole-person region can be incorporated as input to the final pose-normalized representation. The whole-person region refers to a portion of the digital image (or the entire image) that covers the entire person depicted in the image.

In some embodiments, a deep learning network that is more complex than the convolutional neural network 400 is used for the whole-person region than the networks for the part patches. Deep convolutional features from the model trained on existing dataset can be used as the deep representation on the whole-person region.

The deep representation data for the whole-person regions is illustrated as the deep representation 350 in FIG. 3. The process 300 can further incorporate the deep representation data 350 for the whole-person region into the concatenated feature data set.

The process 300 feeds the set of concatenated feature data into a classification engine for predicting a human attribute. The process 300 can provide different classification engines for predicting different human attributes. The classification engines can include, e.g., linear classifiers such as support vector machines (SVMs). A linear classifier can be trained using the pose-normalized representation for one of the interested attributes to get the final prediction. Other types of classifiers or neural networks can be used to predict human attributes based on the concatenated feature data.

Figure 5A:
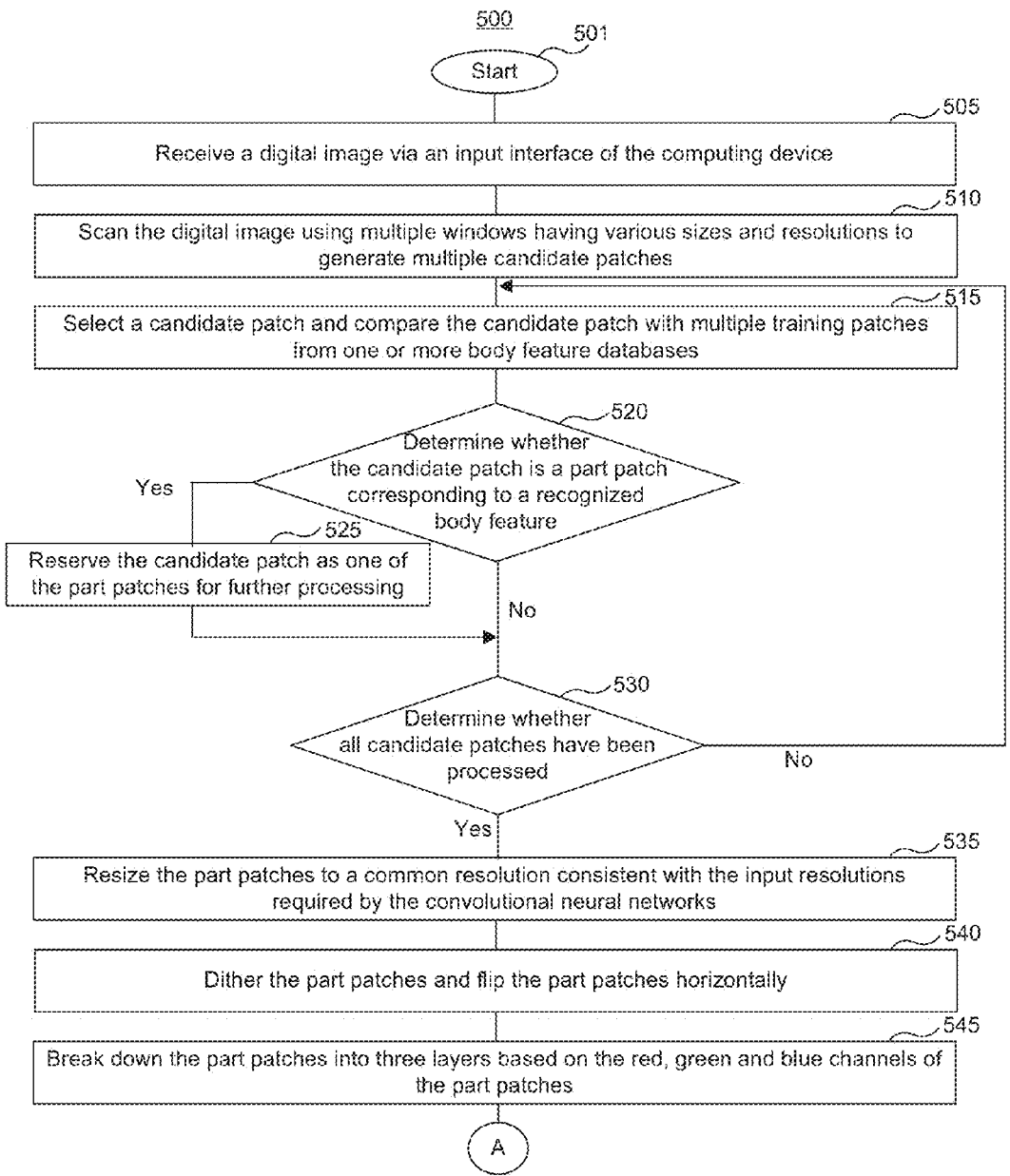
FIGS. 5A and 5B are flow diagrams illustrating a process for determining image attributes from digital images, in various embodiments.
Figure 5B:
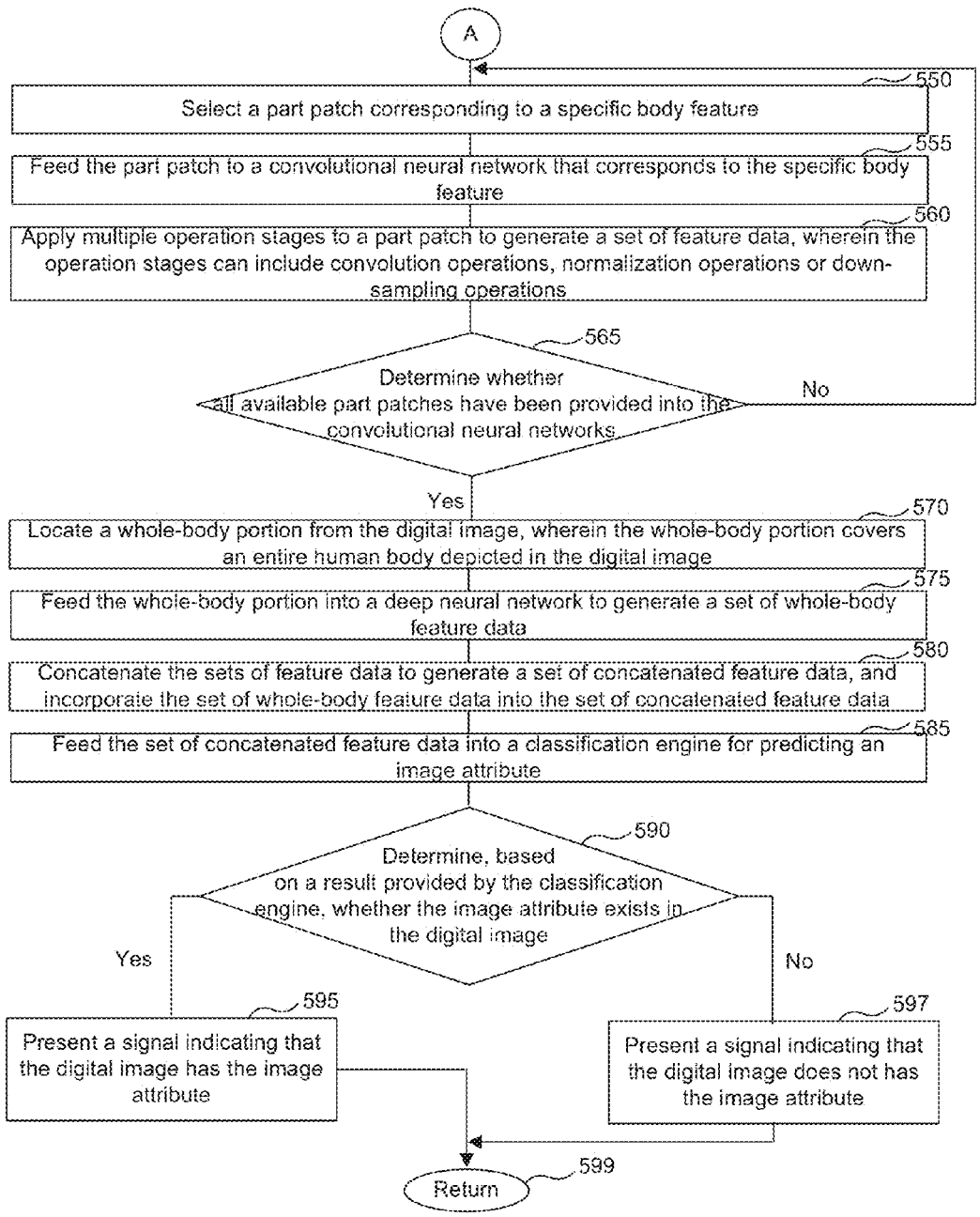

FIGS. 5A and 5B are flow diagrams illustrating a process for determining image attributes from digital images, in various embodiments. The process 500 starts at block 505 in FIG. 5A, where a computing device receives a digital image via an input interface of the computing device. At block 510, the computing device scans the digital image using multiple windows having various sizes and resolutions to generate multiple candidate patches. The candidate patches can contain portions of the content of the digital image. At block 515, the computing device selects a candidate patch and compares the candidate patch with multiple training patches from one or more body feature databases. The training patches can be annotated with keypoints of body parts, e.g., by human interpreters. The databases can contain the training patches that form clusters in a 3D configuration space, the clusters corresponding to recognized body features (e.g., human body portions or poses).

At decision block 520, the computing device determines whether the candidate patch is a part patch corresponding to a recognized body feature based on the comparisons. The recognized human body feature corresponds to a human body portion or pose from a specific viewpoint. If so, at block 525, the computing device reserves the candidate patch as one of the part patches for further processing. Otherwise, the process 500 continues to decision block 530, where the computing device determines whether all candidate patches have been processed. If there is still a candidate patch that has not been processed yet, the process 500 goes to block 515 to process another candidate patch.

Once all candidate patches are processed, the computing device has located multiple part patches that correspond to different recognized body features. At block 535, the computing device resizes the part patches to a common resolution consistent with the input resolutions required by the convolutional neural networks. At block 540, the computing device can further dither the part patches and flip the part patches (e.g., horizontally and/or vertically) in order to improve the generalization. At block 545, the computing device can break down the part patches into three layers based on the red, green and blue channels of the part patches. Alternatively, the computing device can break down the part patches based on other criterions or choose not to break down the part patches. The process 500 proceeds to block 550 in FIG. 5B.

At block 550 in FIG. 5B, the computing device selects a part patch corresponding to a specific body feature. At block 555, the computing device feeds the part patch to a convolutional neural network that corresponds to the specific body feature. For example, the convolutional neural network may have been trained using data associated with the specific body feature. At block 560, the computing device applies multiple operation stages to a part patch to generate a set of feature data as an output of the convolutional neural network, wherein the operation stages can include convolution operations, normalization operations or down-sampling operations. In some alternative embodiments, the computing device can use other types of deep learning networks to generate the feature data.

At decision bock 565, the computing device determines whether all available part patches have been provided into the convolutional neural networks. If not, the process 500 goes to block 550 again to process another part patch. If all available part patches have been provided into the convolutional neural networks, the process 500 continues to block 570. In the process 500, the computing device processes the part patches using corresponding convolutional neural networks in a loop sequence. Alternatively, the computing device can process the part patches in parallel. For example, if the computing device includes multiple central processing units or graphical processing unit(s) that are capable of parallel processing, the computing device can process the part patches simultaneously.

At block 570, the computing device locates a whole-body portion from the digital image, wherein the whole-body portion covers an entire human body depicted in the digital image. At block 575, the computing device feeds the whole-body portion into a deep neural network to generate a set of whole-body feature data. The deep neural network may have been trained using data associate with whole-body parts or poses. Alternatively, the computing device can process the whole-body portion before processing the part patches or simultaneously. For example, the part patches and the whole-body portion can be processed in parallel. In some other embodiments, the computing device skips the steps for processing the whole-body portion.

At block 580, the computing device concatenates the sets of feature data to generate a set of concatenated feature data, and incorporates the set of whole-body feature data into the set of concatenated feature data if there is a set of whole-body feature data.

At block 585, the computing device feeds the set of concatenated feature data into a classification engine for predicting an image attribute. The classification engine can comprise a linear support vector machine that is trained using training data associated with the image attribute. The image attribute is an attribute that relates to the content of the digital image. For example, the image attribute can include a human attribute that relates to a person depicted in the digital image. The human attribute can include, e.g., gender, age, race, hair or clothing. The computing device can feed the concatenated feature data into multiple classification engines for predicting multiple attributes. These classification engines can be trained using different training data associated with different image attributes. The computing device can operate the classification engines in a sequential order or in parallel.

At block 590, the computing device determines, based on a result provided by the classification engine, whether the image attribute exists in the digital image. The result provided by the classification engine may comprise a prediction score indicating the likelihood of the image attribute existing in the digital image. If so, at block 595, the computing device can present, through an output interface of the computing device, a signal indicating that the digital image has the image attribute. Otherwise at block 597, the computing device can present, through an output interface of the computing device, a signal indicating that the digital image does not has the image attribute.

Those skilled in the art will appreciate that the logic illustrated in FIGS. 5A and 5B and described above, may be altered in a variety of ways. For example, the order of the logic may be rearranged, substeps may be performed in parallel, illustrated logic may be omitted, other logic may be included, etc. For example, the process 500 may omit the steps that relate to the whole-body portion. The process 500 may execute the steps for different convolutional neural networks in parallel.

The process 500 as shown in FIGS. 5A and 5B has been tested with different datasets, e.g., a first human attributes dataset including 4013 training images and 4022 test images. The first dataset is challenging for traditional methods as it includes people with wide variation in pose, viewpoint and occlusion.

Figure 7:
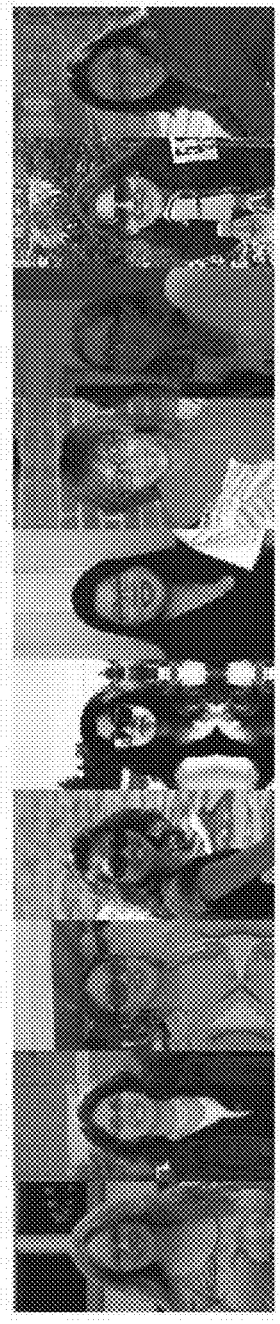
FIG. 7 is a block diagram illustrating example part patches detected from various images with high prediction scores, in various embodiments.
Figure 7:
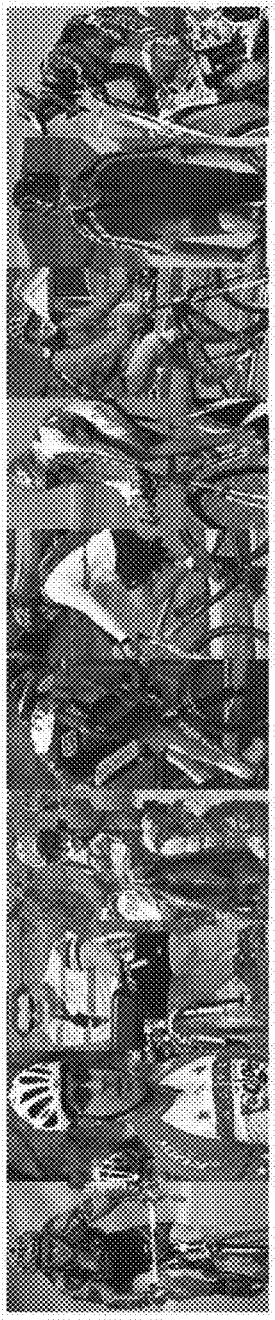
Figure 7:

FIG. 6 illustrates a table 600 showing results of applying the process 500 and traditional methods on the first human attributes dataset. The numbers are prediction scores of corresponding attributes recognized from the dataset; higher prediction scores indicate better attribute prediction results. The first two rows show the results using two traditional attribute recognition methods on the first dataset. As the table 600 shows, the process 500 significantly outperforms the traditional attribute recognition methods across the tested attributes. FIG. 7 is a block diagram illustrating example part patches detected from various images with high prediction scores, in various embodiments. Groups of patches in FIG. 7 show attribute prediction results returned by the process 500 by generating queries of several attributes. For example, to search for images of persons wearing both a hat and glasses (e.g., query b in FIG. 7), the process 500 can return the images with the largest cumulative score for those attributes.

Figure 8:
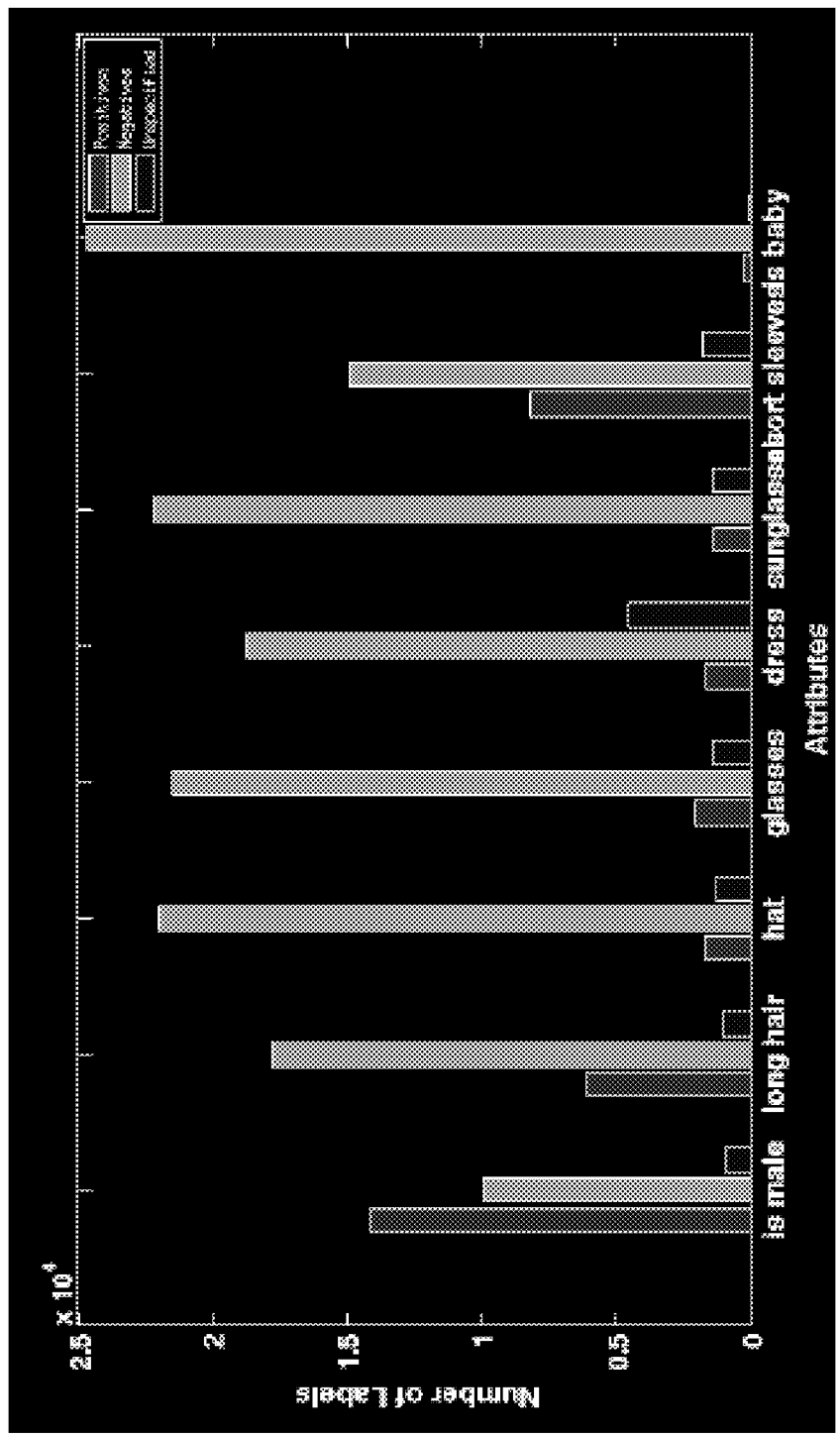
FIG. 8 is a bar chart diagram illustrating statistics of determination of some sample attributes in images of a human attribute dataset.

The process 500 has been further tested in a second human attribute dataset. The second dataset includes 8737 training images, 8737 validation images, and 7489 test images. The statistics of the images of the second dataset are similar to the first dataset, with large variation in viewpoint, pose and occlusions. FIG. 8 is a bar chart diagram illustrating statistics of determination of some sample attributes in images of the second human attribute dataset. For example, FIG. 8 shows the numbers of occasions when an attribute of being male is positively determined, negatively determined, or unspecified.

FIG. 9 illustrates a table 900 showing the results of applying the process 500 and three traditional methods on the second human attributes dataset. The numbers are prediction scores of corresponding attributes recognized from the second human attributes dataset; higher prediction scores indicate better attribute prediction results. The first three rows show the results using three traditional attribute recognition methods on the second dataset. As the table 900 shows, the process 500 significantly outperforms the traditional attribute recognition methods across the tested attributes.

FIG. 10 illustrates a table 1000 showing the performance of the process 500 as a function of the viewpoint of the person. The images are divided into three categories: frontal, profile and back-facing. The category of frontal images, which shows both eyes of the person, includes approximately 60% of the dataset. The category of profile views includes images in which one eye is visible. The category of back-facing views includes images in which both eyes are not visible. The numbers in FIG. 10 are prediction scores of corresponding attributes recognized from the images; higher prediction scores indicate better attribute prediction results. The performance scores in the table 1000 show that the process 500 can work very well across a wide range of viewpoints.

Figure 11:
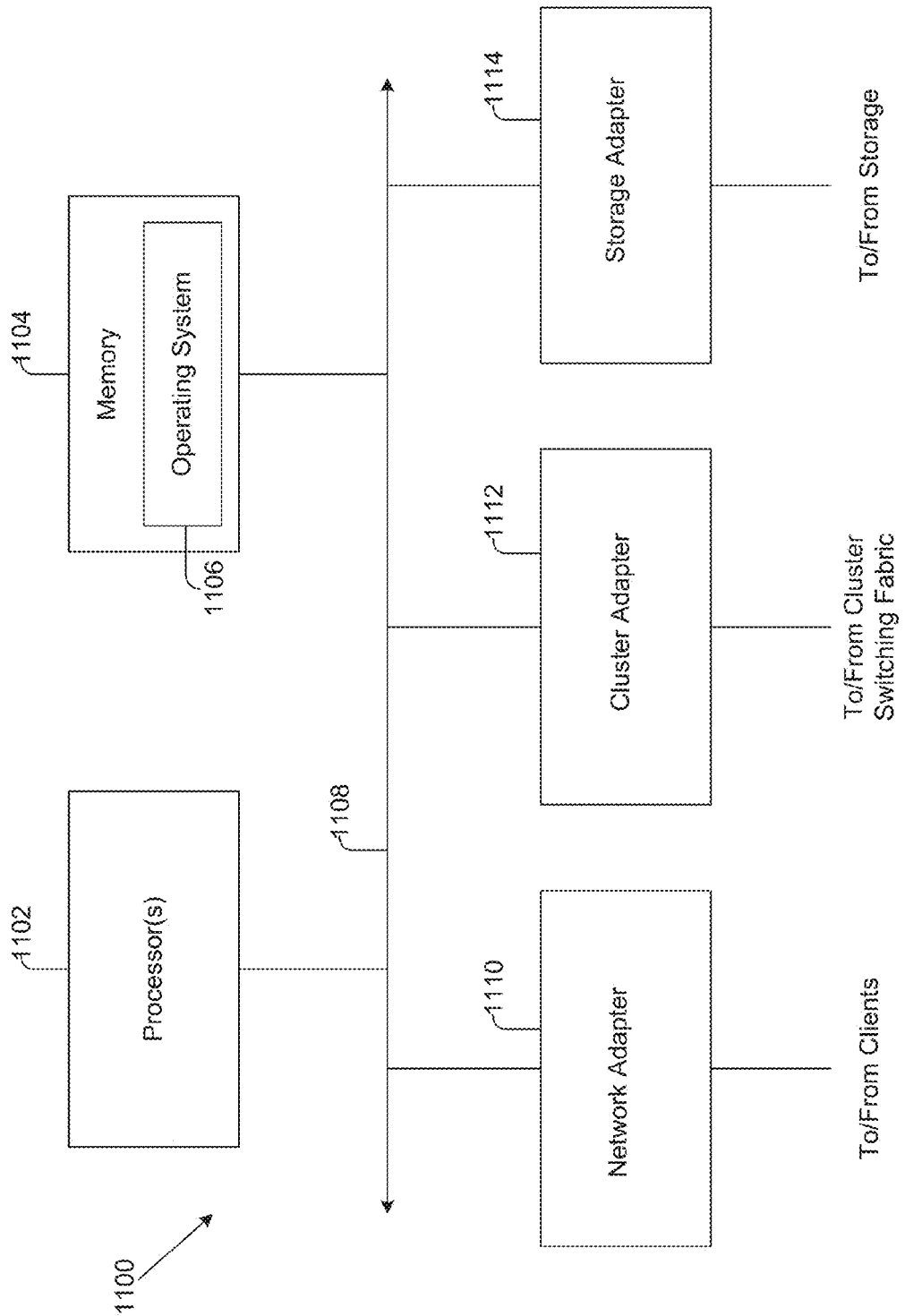
FIG. 11 is a high-level block diagram illustrating an example of a hardware architecture of a computing device that performs attribute classification or recognition, in various embodiments.

FIG. 11 is a high-level block diagram illustrating an example of a hardware architecture of a computing device 1100 that performs attribute classification or recognition, in various embodiments. The computing device 1100 executes some or all of the processor executable process steps that are described below in detail. In various embodiments, the computing device 1100 includes a processor subsystem that includes one or more processors 1102. Processor 1102 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1100 can further include a memory 1104, a network adapter 1110, a cluster access adapter 1112 and a storage adapter 1114, all interconnected by an interconnect 1108. Interconnect 1108 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 1112 includes one or more ports adapted to couple the computing device 1100 to other devices. In the illustrated embodiment, Ethernet can be used as the clustering protocol and interconnect media, although other types of protocols and interconnects may be utilized within the cluster architecture described herein.

The computing device 1100 can be embodied as a single- or multi-processor storage system executing a storage operating system 1106 that can implement a high-level module, e.g., a storage manager, to logically organize the information as a hierarchical structure of named directories, files and special types of files called virtual disks (hereinafter generally "blocks") at the storage devices. The computing device 1100 can further include graphical processing unit(s) for graphical processing tasks or processing non-graphical tasks in parallel.

The memory 1104 can comprise storage locations that are addressable by the processor(s) 1102 and adapters 1110, 1112, and 1114 for storing processor executable code and data structures. The processor 1102 and adapters 1110, 1112, and 1114 may, in turn, comprise processing elements and/or logic circuitry configured to execute the software code and manipulate the data structures. The operating system 1106, portions of which is typically resident in memory and executed by the processors(s) 1102, functionally organizes the computing device 1100 by (among other things) configuring the processor(s) 1102 to invoke. It will be apparent to those skilled in the art that other processing and memory implementations, including various computer readable storage media, may be used for storing and executing program instructions pertaining to the technology.

The memory 1104 can store instructions, e.g., for a body feature module configured to locate multiple part patches from the digital image based on the body feature databases; an artificial neural network module configured to feed the part patches into the deep learning networks to generate multiple sets of feature data; an classification module configured to concatenate the sets of feature data and feed them into the classification engine to determine whether the digital image has the image attribute; and an whole body module configured to processing the whole body portion.

The network adapter 1110 can include multiple ports to couple the computing device 1100 to one or more clients over point-to-point links, wide area networks, virtual private networks implemented over a public network (e.g., the Internet) or a shared local area network. The network adapter 1110 thus can include the mechanical, electrical and signaling circuitry needed to connect the computing device 1100 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1114 can cooperate with the storage operating system 1106 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1114 can include multiple ports having input/output (I/O) interface circuitry that couples to the disks over an I/O interconnect arrangement, e.g., a conventional high-performance, Fibre Channel (FC) link topology. In various embodiments, the cluster adapter 1112 and the storage adapter 1114 can be implemented as one adaptor configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosed technology is not limited except as by the appended claims.

What is claimed is:

1. A method, performed by a computing device having one or more processing units, for recognizing human attributes from digital images, comprising:
   locating, by the one or more processing units, at least two part patches from a digital image, wherein each of the two part patches comprises at least a portion of the digital image corresponding to a recognized human body portion or pose, wherein said locating comprises:
      scanning the digital image using multiple windows having various sizes, and
      comparing scanned portions of the digital image confined by the windows with multiple training patches from a database,
   wherein the training patches are annotated with keypoints of body parts and the database contains the training patches that form a cluster in a 3D configuration space corresponding to a recognized human body portion or pose;
   providing each of the part patches as an input to one of multiple convolutional neural networks;
   for at least two selected convolutional neural networks among the multiple convolutional neural networks, applying multiple stages of convolution operations to a part patch associated with the selected convolutional neural networks to generate a set of feature data as an output of the selected convolutional neural networks;
   concatenating the sets of feature data from the at least two convolutional neural networks to generate a set of concatenated feature data;
   feeding the set of concatenated feature data into a classification engine for predicting a human attribute; and
   determining, based on a result provided by the classification engine, whether a human attribute exists in the digital image.

2. The method of claim 1, wherein one of the convolution operations uses multiple filters having dimensions of more than one.

3. The method of claim 1, wherein the filters are capable of detecting spatially local correlations present in the part patches.

4. The method of claim 1, further comprising:
   for the at least two selected convolutional neural networks among the multiple convolutional neural networks, applying a normalization operation to the part patch after one of the multiple stages of convolution operations has been applied to the part patch.

5. The method of claim 1, further comprising:
   for the at least two selected convolutional neural networks among the multiple convolutional neural networks, applying a max-pooling operation to the part patch after one of the multiple stages of convolution operations has been applied to the part patch.

6. The method of claim 1, further comprising:
   resizing the part patches to a common resolution, where the common resolution is a required resolution for inputs of the convolutional neural networks.

7. The method of claim 1, further comprising:
   breaking down the part patches into three layers based on the red, green and blue channels of the part patches.

8. The method of claim 1, further comprising:
   presenting, through an output interface of the computing device, a signal indicating whether the human attribute exists in the digital image.

9. The method of claim 1, further comprising:
   locating a whole-body portion from the digital image, wherein the whole-body portion covers an entire human body depicted in the digital image;
   feeding the whole-body portion into a deep neural network to generate a set of whole-body feature data; and
   incorporating the set of whole-body feature data into the set of concatenated feature data.

10. The method of claim 1, wherein the result provided by the classification engine comprises a prediction score indicating the likelihood of the human attribute existing in the digital image.

11. The method of claim 1, wherein the human attribute comprises gender, age, race, hair or clothing.

12. The method of claim 1, wherein the classification engine comprises a linear support vector machine that is trained using training data associated with the human attribute.

* * * * *